United States Patent [19]
Johnson et al.

[11] Patent Number: 5,307,554
[45] Date of Patent: May 3, 1994

[54] PALLET DISMANTLING MACHINE AND CUTTER HEAD ASSEMBLY THEREFOR

[75] Inventors: John L. Johnson, 934 NE. 77th Ave., Portland, Oreg. 97213; Paul E. Herzig, Hillsboro, Oreg.

[73] Assignee: John L. Johnson, Portland, Oreg.

[21] Appl. No.: 984,874

[22] Filed: Dec. 2, 1992

[51] Int. Cl.⁵ .................................................. B23P 19/04
[52] U.S. Cl. .................................. 29/564.3; 29/239; 29/426.4; 83/477
[58] Field of Search .................. 29/564.1, 564.3, 252, 29/239, 426.4, 426.5; 83/477

[56] References Cited

U.S. PATENT DOCUMENTS

| | | | |
|---|---|---|---|
| 3,869,780 | 3/1975 | Ginnow | 29/200 |
| 4,112,578 | 9/1978 | Sanford | 29/252 X |
| 4,285,110 | 8/1981 | Fagre, Jr. | 29/252 |
| 4,320,570 | 3/1982 | Williams | 29/564.3 |
| 4,346,506 | 8/1982 | Martindale | 29/239 |
| 4,586,235 | 5/1986 | Benvenuto | 29/564.3 |
| 4,750,255 | 6/1988 | Hufnagel | 29/564.3 |
| 4,945,626 | 8/1990 | Dykstra et al. | 29/564.3 |
| 5,211,094 | 5/1993 | Johnson | 29/239 X |

*Primary Examiner*—William Briggs
*Attorney, Agent, or Firm*—Eugene M. Eckelman

[57] ABSTRACT

A cutter head assembly for dismantling pallets includes a cross member pivotally supported on a machine. The cross member supports one or more cutter heads thereon in forwardly projecting operational position which is freely slidable in a lateral direction. The cutter heads have an offbearing tray for portions of the pallets. The assembly of cutter heads is tiltable rearwardly on the pivot support to an upper maintenance position. Lock pins hold the cutter head assembly positively between the down operational position and the up maintenance position. The center of gravity of the cutter head assembly is at the pivot support to provide a balanced structure, and a spring loaded member is provided to urge the assembly rotatably down to its operational position. The spring loaded member also maintains the cutter head assembly in its maintenance position. A positive lock is provided between the cutter head assembly and the machine frame in both of these positions.

18 Claims, 2 Drawing Sheets

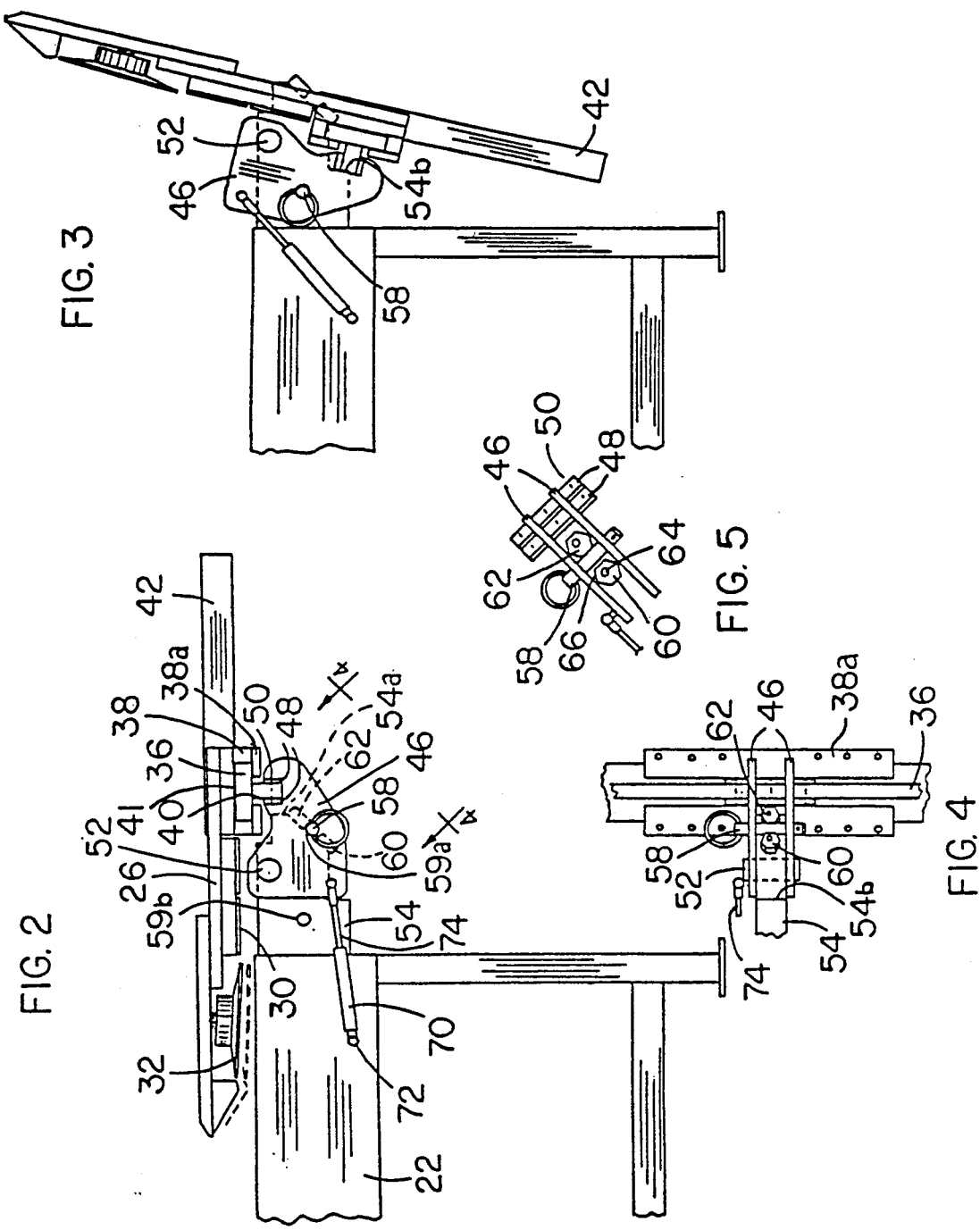

PALLET DISMANTLING MACHINE AND CUTTER HEAD ASSEMBLY THEREFOR

BACKGROUND OF THE INVENTION

This invention relates to new and useful improvements in pallet dismantling machines and to a cutter head assembly therefor.

Wooden pallets are extensively used for stacking products to be transported or stored. Since considerable lumber is used in construction of the pallets, damaged pallets frequently are repaired rather than discarded. Power devices have heretofore been patented for dismantling the pallets, for example, devices shown in U.S. Pat. Nos. 3,869,780, 4,320,570, and 4,945,626. In order for a pallet dismantling machine to be economically feasible, it must operate with such efficiency as to make its use a substantial improvement over hand dismantling or repair. This efficiency must be adequate to the extent that whole or partial dismantling of the pallet is a speedy and low effort operation. Also pallet dismantling machines must be rugged and reliable in use whereby to be substantially free of down time due to repair or maintenance.

In the construction of pallets, they comprise a plurality of upper and lower deck boards nailed transversely to two or more stringers or longitudinally aligned blocks. The pallet structure requires a spacing of the stringers or blocks such that the pallet can receive the forks of a lift truck. Aside from that requirement, pallets are of many different sizes and with different spacing between the stringers or blocks. A single head pallet dismantling machine is not materially affected by different pallet dimensions since the pallets must be run through as many times as there are stringers. Such is a slow process because the pallet has to be returned for cutting the nails of each succeeding stringer or row of blocks.

This problem has been recognized and U.S. Pat. No. 4,320,570 proposes a multiple head pallet dismantling machine that employs lateral adjusting drive for the multiple head supports. This is accomplished by mounting the heads on trolleys and the trolleys are laterally adjusted by hydraulic cylinder means on the machine frame. This type of structure is complex and expensive and financially not available to small operators.

Another problem in dismantling pallets by forcing the nails through free running cutting discs is the violent forces that act on the machine parts and on the pallets as a result of power driven pusher means. Machines such as shown in U.S. Pat. No. 4,320,570 and U.S. Pat. No. 4,945,626 support cutter heads on elongated cantilevered arms. This elongated arm arrangement makes the cutter heads and pallets vulnerable to damage due to the difficulty of properly moving pallets into the cutter head in efficient straight line receptive travel. Any material misalignment between the path of travel of the pallet and the cutter heads can cause severe damage to the heads and to the pallets. Prior machines also do not provide an efficient method of clearing the machine of broken pallet parts.

SUMMARY OF THE INVENTION

According to the invention, it is an object to provide multiple head pallet dismantling means that is greatly simplified in construction as opposed to prior means of this type, and that is less expensive to manufacture.

A further object is to provide pallet dismantling means of the type described that uses novel lateral adjustable support means for two or more cutter heads, and also to provide novel cutter heads in combination with said support means.

Another object is to provide cutter heads that can be pivoted up out of the way in the event that access under the heads is desired such as when a pallet has been damaged, or for maintenance of the cutter heads.

In brief, the invention resides in a cross member that is capable of being associated with or mounted on a pallet dismantling machine frame and capable of holding and guiding one or more cutter heads slidably and adjustably in a lateral direction. Each of the heads is individually and freely slidable and comprises a pair of integrally connected projecting arms supporting free running cutter discs in lateral cutting edge alignment for cutting nails that fasten deck boards to the stringers or blocks. The cross member and the cutter heads are shaped in cross section to provide a lateral sliding but non-rotative engagement, whereby to support the heads laterally in a proper position for receiving the stringer of pallets and also in an operational horizontal position. The entire cutter head assembly in its association with the machine has adjustable locked relation in its operational position but upon release is capable of being tilted rearwardly to provide good access to a pallet support area thereunder in the event that it is necessary to remove damaged pallets or pallet parts or for maintenance. The head assembly is balanced on pivot means and is associated with spring loaded means that control the support of the head assembly in its operational position and to allow the upward tilted rotation to the maintenance position. The cutter head portion of the machine is constructed such that it can be supplied in kit form to consumers.

The invention will be better understood and additional objects and advantages will become apparent from the following description taken in connection with the accompanying drawings.

Figure 1:
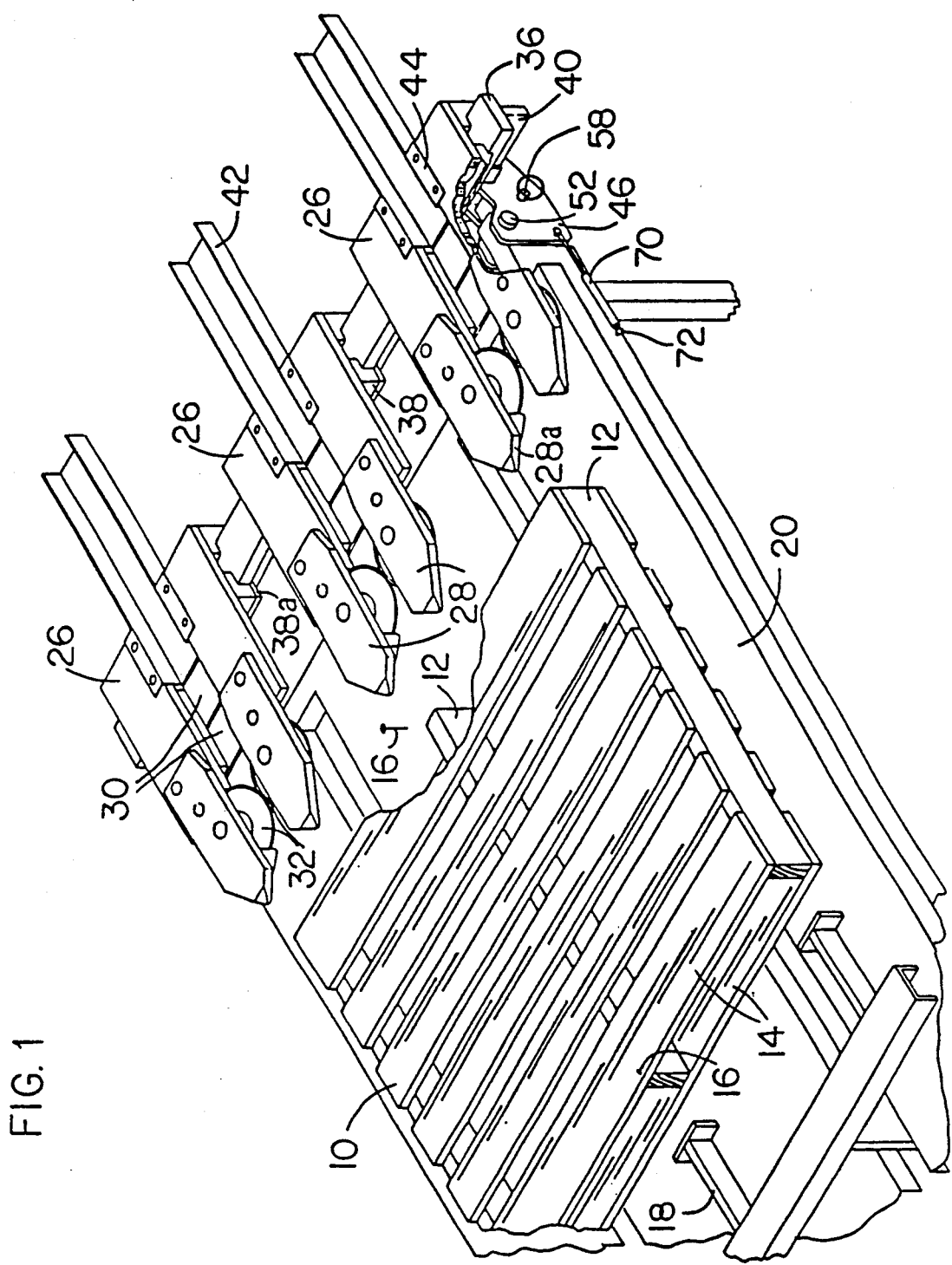
FIG. 1 is an isometric view of a cutter head assembly of the invention, this view also including fragmentary portions of a pallet dismantling machine elements and a pallet.

FIG. a side elevational view taken from the right side of FIG. 1, and showing in full lines a work position of the cutter head assembly.

FIG. 3 is a view similar to FIG. 2 but showing in broken lines the cutter head assembly tilted up away from a pallet support the machine.

FIG. 4 is a fragmentary view taken on the line 4—4 of FIG. 2, and

FIG. 5 a fragmentary bottom plan view of a rearwardly disposed cross member of the cutter head assembly.

DETAILED DESCRIPTION OF A PREFERRED EMBODIMENT

With particular reference to the drawings and first to FIG. 1, the numeral 10 designates a conventional pallet of the type having longitudinal spacing members 12 and top and bottom deck boards 14 fastened to the stringers by nails 16. Pallets of this type have various size dimensions of their deck support surface and also the spacing members assume various spacings. Some pallets utilize full length longitudinal stringers and some use longitudinally aligned, spaced blocks. Stringers are used as illustration in the drawings. The function of the present machine is identical with either full length stringers or blocks. The numeral 18 designates a conventional powered pushing mechanism that operates in connection with a work table 20 supported on a suitable frame 22.

The present invention utilizes at least two cutter heads 26, preferably three, to accommodate the usual pallet having three spacing members 12. Each cutter head employs a pair of forwardly projecting arms or mounts 28 secured integrally together by cross or bridge plates 30. Arms 28 support respective free running cutter discs 32 in edge cutting relation for severing nails 16 that hold the deck boards 14 to the spacing members of the pallet when the pallet is forced through the cutter heads.

The cutter heads 26 have individual free sliding or floating engagement in a lateral direction with a holding and guiding cross member 36 supported on the machine frame in a manner to be described hereinafter. The cutter heads have front and rear integral depending extensions 38, also seen in FIG. 2, that have inwardly angled plates 38a bolted in place that are engageable with undercut or notched portions 40 of the cross member 36. A suitable and representative construction of the cross member 36 is a T-bar. Such structure provides a stabilized, substantially horizontal projection of the cutter heads 26 over the table surface but capable of being freely movable laterally. Low friction means 41 are provided on the engaging surfaces between the cross member 36 and the heads.

In the use of the machine with the present head assembly, the cutter heads 26 are first manually shifted laterally so as to be approximately in line with the stringers of the pallet being dismantled. The pallet is then forced through the heads with the top and bottom deck boards straddling the heads. Upon severing one layer of the deck boards, comprising the bottom layer, the pallet is turned over and run through again. The arms 28 of the cutter heads have tapered nose portions 28a and adjust automatically from a rough setting in a lateral direction as they are engaged by the pallet. Each of the cutter heads has a rearwardly extending offbearing tray 42 through which the spacing members 12 of the pallets travel after being cut, these offbearing trays extending across the top of the cross member 36 for protecting the top surface of the latter from nail stubs that may project slightly from the stringers. Preferably the troughs have lateral flanges 44 for screw attachment to the cutter heads and thus are removable and capable of being replaced.

Frequently it is necessary to remove damaged pallet parts from under the heads, and for this purpose the entire cutter head assembly is capable of being swung up rearwardly to provide access to the broken pallets on the table or for maintenance. For this purpose, cross member 36 and the heads are tiltable in a counterclockwise direction from a horizontal operational position, FIG. 2, to a raised position shown in broken lines in FIG. 3. For this purpose the cross member 36 is secured to pairs of plate-like rocker arms 46, also seen in FIGS. 4 and 5, such pair of rocker arms being disposed at each side of the machine and integrated with the cross member 36 such as by a welded connection thereof to adapter plates 48 recessed in the rocker arms and removably secured to the cross member 36, as by bolts 50, such bolts being illustrated diagrammatically. The rocker arms 46 have pivot support at an upper portion thereof and at the opposite end from cross member 36 on stub shafts 52 mounted in heavy duty extensions 54 of the machine frame. The support of the cross member 36 and the cutter heads 26 is on the stub shafts 52. Rotation and positioning of the cross member and its cutter heads between a substantially horizontal operational position of the cutter heads, as shown in FIG. 2, and a rearwardly tilted maintenance position, as shown in FIG. 3, is controlled by pins 58 removably supported in apertures 59a and 59b in the rocker arms 46 and frame extension 54, respectively.

Lower and upper abutments or stops 60 and 62, respectively, are secured on the end 54a of frame extensions 54 of the machine, the lower stops 60 preventing rotation of the rocker arm assemblies and cutter heads rearwardly due to engagement of this lower stop by pin 58. Frame extensions 54 are of selected length such that contoured ends 54a thereof terminate longitudinally between the cross member 36 and the stub shafts 52, and the stops are integrally secured to the front end 54a of the frame extensions in upper and lower positions on opposite sides of the apertures 59a in the rocker arms.

The center of gravity of the heads is approximately at the pivot support 52, thus providing a balanced cutter head assembly supported on stub shafts 52. The heads are urged downwardly by means to be described, and are positively limited in a down position, namely, the broken line position of FIG. 2, by abutment of the pins 58 up against the upper stops 62. Conversely, the pins 80 limit upward pivotal movement of the head assembly by abutment of pins 80 with stops 60. Stops 60 and 62 are mounted on the ends of the frame extension 54 by offset center screws 64 tapped into the frame extensions to provide adjustable rotative positioning of the stops. The stops have multiple flat surface areas 66 which upon loosening the screws 64 can be positioned selectively by the eccentric relationship to provide a desired space between the stop surfaces that allows the heads to pivot in a limited but workable range. That is, the lower stops 60, and also the upper stops if necessary, are adjusted on their attaching screws to allow a small upward travel of the cutter heads as determined by the thickness of the bottom deck boards of the pallet that engage the arms and push them up to the necessary height when cutting, namely a working range between the two shown limits.

The cutter head assembly has spring loaded connection and is controlled by conventional gas filled spring members 70. Each member 70 has a pivot base connection 72 to the machine frame 22 forward of the pivot point 52 and its spring loaded cushioned rod 74 has pivot connection to a forward portion of the rocker arms assembly 46. The member 70 has selective attachment to the frame and the rocker arm assembly, as well as selective throw length, such that its spring force applies a hold down resilient force on the head assembly, limited by the range of movement of pins 80 between the adjusted stops 60 and 62 in the substantially horizontal operational position of the latter, FIG. 2. The geometry of the rocker arms 46 and the gas filled spring members 70 is such that a spring force also is exerted to maintain the head assembly in its raised maintenance position. To tilt the head assembly up, it is merely necessary to remove the pins 58 and manually force the head assembly up against the force of the spring members 70. In such raised position, the bottom surface of the cross member 36 abuts against a lower portion 54b of the frame extension 54 to function as a stop and such position will be an over-center position as shown in FIG. 3. At this stop position, apertures 59a and 59b will be aligned and pins 80 are inserted to provide a positive lock in this raised position. When moving the head assembly down, it will move by gravity when pushed forward past its over-center position. The cushion feature of the gas filled spring member will support the head assembly for slowed movement.

As best viewed in FIGS. 2 and 3 which shows the down or operational position of the head assembly, it is to be noted that the forces accomplishing the cutting of the nails, namely, at the cutting edges of the cutter discs, are substantially horizontally aligned with the resisting structural point, namely, the upper end of the cross member 36. This straight-on force of the pusher mechanism eliminates disadvantages of pushing forces that operate out of alignment with the resisting point.

According to the invention, a simplified and relatively inexpensive cutter head assembly is provided for pallet dismantling machines. The lateral adjusting support of the heads comprises a simplified but very workable structure as well as a sturdy structure that holds the short and compact cutter heads effectively for engagement by the pallets for minimum damaging engagement of the heads or the pallets. The heads have assisting pivoted spring support on the frame by the members 70 rather than an elongated fully cantilevered rigid support of the type used in prior devices, thus contributing to ruggedness and efficiency of the machine and the economy thereof. The tilting feature of the heads comprises an improvement which allows broken pallets or pieces thereof to be readily removed from the machine.

It is to be understood that the form of our invention herein shown and described is to be taken as a preferred example of the same and that various changes in the shape, size and arrangement of parts may be resorted to without departing from the spirit of our invention, or the scope of the subjoined claims. For example, the cutter heads may take other forms such as heads using both top and bottom cutter discs.

Having thus described our invention, we claim:

1. A pallet dismantling machine for pallets of the type having deck boards nailed to longitudinally aligned spacing members, said machine comprising:
    a frame having forward and rearward ends,
    a cutter head assembly,
    a cross member on said cutter head assembly,
    cutter head means projecting forwardly from said cross member,
    laterally extending pivot means supporting said cutter head means on said frame,
    the center of gravity of said cutter head assembly being substantially at said pivot means to provide a balanced structure,
    and resilient means acting between said frame and said cutter head means urging the latter rotatably down to an operational position for dismantling pallets.

2. The pallet dismantling machine of claim 1 wherein said cutter head means is rotatable on said pivot between the down operational position and an up maintenance position, said resilient means acting to maintain said cutter head assembly in both of said positions.

3. The pallet dismantling machine of claim 1 including positive lock means between said cutter head assembly and said frame in both of said positions.

4. A cutter head assembly for a machine that dismantles pallets of the type having deck boards nailed to longitudinally aligned spacing members, said assembly comprising:
    a laterally extending cross member capable of association with a pallet dismantling machine,
    said cross member having forward and rearward portions and a top surface,
    cutter head means disposed in a forward substantially horizontal projecting relation, each of said cutter head means including a pair of forwardly extending mounts disposed in integral, laterally spaced parallel relation through which pallet spacing members pass in a nail cutting operation, cutter discs on said mounts for cutting nails between the longitudinally aligned spacing members and the deck boards of a pallet,
    attaching means on said cross member and said cutter head assembly supporting said cutter head means in said horizontal projecting relation, said attaching means comprising a slidable support engagement of said cutter head means on said cross member in a lateral direction and also comprising a non-rotatable engagement of the cutter head assembly on said cross member,
    and off-bearing tray means extending rearwardly of said cutter head means in alignment with the space between said mounts forming discharge guide means for the pallet spacing members.

5. The cutter head assembly of claim 4 wherein said offbearing tray means is mounted on said cutter head means and extends forwardly at least to the forward portion of said cross member to protect the top surface of said cross member from pallet spacing members moving thereover.

6. The cutter head assembly of claim 5 wherein said tray means is removably secured on said cutter head means.

7. A cutter head assembly for a machine that dismantles pallets of the type having deck boards nailed to longitudinally aligned spacing members, said assembly comprising:
    a laterally extending cross member capable of association with a pallet dismantling machine, said cross member having forward and rearward portions and a top surface,
    cutter head means disposed in a forward substantially horizontal projecting relation for cutting nails between the longitudinally aligned spacing members and the deck boards of a pallet,
    attaching means on said cross member and said cutter head assembly supporting said cutter head means in said horizontal projecting relation, said attaching means comprising a slidable support engagement of said cutter head means on said cross member in a lateral direction and also comprising a non-rotatable engagement of the cutter head assembly on said cross member,
    and pivot connecting means capable of connection between said cross member and a pallet dismantling machine wherein said cross member and cutter head means are tiltable rearwardly to raise the cutter head from a horizontal operational position to a raised maintenance position.

8. A cutter head assembly for a machine that dismantles pallets of the type having deck boards nailed to longitudinally aligned spacing members, said assembly comprising:
    a single laterally extending cross member capable of mounting on a pallet dismantling machine, said cross member having a T-bar cross sectional shape with forward and rearward lower surfaces and a top surface, cutter head means having its full support by said single cross member in a forward substantially horizontal projecting relation for cutting nails between the longitudinally aligned spacing members and the deck boards of a pallet, attaching means on said cross member and said cutter head assembly supporting said cutter head means in said horizontal projecting relation, said attaching means comprising a slidable support engagement of said cutter head means on said surfaces of said cross member in a lateral direction and also comprising a non-rotatable engagement of the cutter head assembly on said cross member.

9. The cutter head assembly of claim 7 including stop means capable of attachment to a pallet dismantling machine for positioning said cutter head means in each of its horizontal operational position and its raised maintenance position.

10. The cutter head assembly of claim 9 wherein the stop means for said raised maintenance position of said cutter head means provides an over-center support for said cutter head means.

11. The cutter head assembly of claim 9 including spring means urging said cutter head means to each of its horizontal operational position and its raised maintenance position.

12. The cutter head assembly of claim 7 including first stop means capable of connection to a pallet dismantling machine supporting said cutter head means in its horizontal projecting relation, and second stop means capable of connection to a pallet dismantling machine and spaced from said first stop means, said second stop means being engageable by said cutter head means and limiting upward adjusting movement of said cutter head means as determined by the thickness of deck boards of a pallet being dismantled.

13. The cutter head assembly of claim 12 including adjusting means associated with said second stop means for adjusting said upward adjusting movement of said cutter head means.

14. A pallet dismantling machine for pallets of the type having deck boards nailed to longitudinally aligned spacing members, said machine comprising:

a frame, a single laterally extending cross member, means mounting said cross member on said frame, said cross member having a T-bar cross sectional shape with forward and rearward lower surfaces and a top surface, cutter head means in a forward substantially horizontal projecting relation for cutting nails between the longitudinally aligned spacing members and the deck boards of a pallet, attaching means on said cross member and said cutter head assembly supporting said cutter head means in said horizontal projecting relation, said attaching means comprising a slidable support engagement of said cutter head means on said surfaces of said cross member in a lateral direction and also comprising a non-rotatable engagement of said cutter head means on said cross member.

15. The pallet dismantling machine of claim 14 including pivot connecting means connected between said cross member and said frame wherein said cutter head means and said cross member are tiltable rearwardly to raise the cutter means away from its horizontal projecting position.

16. The pallet dismantling machine of claim 14 wherein said means mounting said cross member on said frame comprises shaft means supported on said frame forward of said cross member, and longitudinally extending rocker arm means rotatably supported by said shaft means and integrated with said cross member, and stop means operative between said rocker arm means in said frame selectively positioning said cutter head means in its substantially horizontal position.

17. The pallet dismantling machine of claim 1 including adjustable stop means providing a range of adjustment for said cutter head means in its down operational position.

18. The cutter head assembly of claim 1 including at least two said cutter head means adjustably engageable with said cross member for relative lateral spacing, said cutter head means being disconnected from each other whereby to have free slidable adjusting movement.

* * * * *